Patented Dec. 31, 1946

2,413,483

UNITED STATES PATENT OFFICE 2,413,483

PROCESS FOR PREPARING CHLORO-INDANTHRONES

Clarence F. Belcher, Bridgeton, N. J., assignor to E. I. du Pont de Nemours & Company, Wilmington, Del., a corporation of Delaware No Drawing. Application August 7, 1943, Serial No. 497,873

3 Claims. (Cl. 260—265)

This invention relates to an improvement in the process for preparing chlorinated indanthrones, and has for its object the manufacture of 3,3'-dichloroindanthrone in high yields and in a high state of purity by a simple and economical process.

While a number of processes have been described wherein indanthrone (N-dihydro-anthraquinone azine) can be chlorinated to the 3,3'-dichloro-derivative, it is impossible by many of these processes to control the chlorination to the extent required to give the dichloroindanthrone of satisfactory bleach fastness and yet one which will have good solubility or stability in the vat. Other processes which have been devised require conditions which are impractical for commercial operations, so that one of the most satisfactory methods for preparing the 3,3'-dichloroindanthrone of the high purity desired and in yields satisfactory for commercial purposes has been the chlorination of the 3,3'-dibromo-indanthrone, which, because of the intermediates employed in its preparation, can be produced in high yields and at comparatively low cost.

While it has been known that indanthrone can be chlorinated in sulfur as the solvent to give a relatively pure 3,3'-dichloroindanthrone, such a solvent or reaction medium is impractical for use on a commercial scale for it involves technical difficulties in the separation and final purification of the desired product.

I have found that 3,3'-dichloroindanthrone which contains substantially no extraneous halogen in the molecule can be produced satisfactorily and at relatively low cost by carrying out the chlorination of indanthrone or 3,3'-dibromoindanthrone in an inert high boiling solvent which will permit temperatures above 200° C. to be employed where the reaction is carried out in the presence of sulfur dissolved in such solvent. Trichlorobenzene has been found to be a most satisfactory solvent because of its high boiling point and the fact that at the high temperatures employed sulfur dissolves readily therein. The amount of sulfur employed in the process should be from 1 to 3 parts, based on the weight of the indanthrone compound. The use of 3 parts of sulfur is preferred, and, while larger amounts may be used, the use of such larger amounts is unnecessary. By employing sulfur in the process the chlorine introduced is directed entirely to the 3,3'-positions so that the resulting product which is first obtained in the azhydrine form is readily reduced to a 3,3'-dichloroindanthrone of high purity. Where the chlorine is introduced to replace bromine in 3,3'-dibromoindanthrone, the bromine is completely replaced by the chlorine with no additional chlorine being introduced into the molecule. The chlorination is carried out in either case at temperatures preferably of from 200° to 220° C., although temperatures of as high as 260° C. may be employed.

The following examples are given to illustrate the invention. The parts used are by weight.

Example 1

40 parts of N-dihydroanthraquinone azine (indanthrone) is charged into a reactor containing 80 parts of sulfur and 320 parts of trichlorobenzene. The temperature is raised to from 210° to 215° C., and, while under agitation, chlorine gas is admitted over a period of 2½ hours or until no more blue crystals are evident by microscopic inspection. The reaction mass is then cooled to 150° C. (at which temperature the sulfur remains easily soluble in the solvent), filtered, and washed with a little trichlorobenzene. The cake is then transferred to a closed vessel containing 125 parts of $Na_2S.9H_2O$ dissolved in 1000 parts of water, then steamed free of solvent and filtered. The cake is washed with water and dried.

A yield of 43 parts (92.9% theory) of 3,3-dichloroindanthrone in the azhydrin form is obtained having the following analysis: $Cl=13.52\%$ and $N=5.52\%$. Reduction of the 3:3'-dichloro-1:2-2':1 anthraquinone-azhydrin with dilute alkaline hydrosulfite and subsequent aeration as commonly practiced results in a 3:3'-dichloroindanthrone of high purity.

Example 2

80 parts of 3,3'-dibromo-N-dihydroanthraquinone azine (3,3'-dibromoindanthrone) is suspended in a mixture of 100 parts of sulfur and 640 parts of trichlorobenzene. After heating to 210°–220° C., chlorine gas is passed into the suspension under agitation for a period of 8 hours, or until, on microscopic examination, all of the blue crystals have disappeared. After filtering at 170° C., the charge is washed with trichlorobenzene, then with alcohol, and further treated with sodium sulfide solution as in Example 1. A yield of 64 parts is obtained, equal to 93.8% of theory, of a 3,3'-dichloroindanthrone in the azhydrin form containing 14.12% of chlorine and no bromine.

Any inert high boiling organic solvent or diluent may be employed which has a high solvent power for sulfur, preferably at above 150° C., such as trichlorobenzene, chlorinated naphthalenes and chlorinated diphenyl. The solvent should be one which permits operating temperatures above 200° C.

In the chlorination of the dibromoindanthrone, the 3,3'-dibromoindanthrone is preferably added to the cold mixture of sulfur and trichlorobenzene, for it has been found that this gives the most desirable crystalline form to be reacted upon by the chlorine and therefore requires less time for complete replacement of the bromine.

By employing a high boiling inert organic solvent in which the sulfur has good solubility, the 3,3'-dichloroindanthrone largely in the form of azhydrin is more readily removed from the reaction mass and isolated in a state of high purity. The solution is filtered, and the traces of sulfur removed by sodium sulfide treatment, as above described. After reduction there remains a 3,3'-dichloroindanthrone of high purity. If desired, this may be further purified by dissolving in concentrated sulfuric acid, from which it is crystallized by diluting the acid to from 83% to 90% strength. The use of the sulfur in the process inhibits the formation of higher halogen indanthrones and appears to have a strong influence in directing the chlorine to the 3,3'-positions in the indanthrone molecule.

In the chlorination of the indanthrone itself, the sulfur facilitates the introduction of the chlorine into the indanthrone molecule, for in the absence of the sulfur it is difficult to obtain the dichloroindanthrone of maximum bleach fastness.

I claim:

1. In the process for preparing 3,3'-dichloroindanthrone wherein a compound of the class consisting of indanthrone and 3,3'-dibromoindanthrone is reacted with chlorine gas, the steps which comprise carrying out the chlorination in a high boiling organic solvent which is inert under the conditions of the reaction containing sulfur dissolved therein, the chlorination being carried out at temperatures of from 200° C. to 260° C.

2. The process for preparing 3,3'-dichloroindanthrone which comprises reacting 3,3'-dibromoindanthrone with chlorine gas in trichlorobenzene in which sulfur is dissolved, the chlorination being carried out at temperatures of from 200° to 220° C. until replacement of the bromine is complete.

3. The process which comprises reacting indanthrone with chlorine gas in trichlorobenzene in which sulfur is dissolved, the chlorination being carried out at temperatures of from 200° to 220° C., until no further chlorine is introduced into the molecule.

CLARENCE F. BELCHER.